United States Patent
Lee et al.

(10) Patent No.: US 9,905,925 B2
(45) Date of Patent: Feb. 27, 2018

(54) NFC ANTENNA MODULE AND PORTABLE TERMINAL COMPRISING SAME

(71) Applicant: AMOTECH CO., LTD., Incheon (KR)

(72) Inventors: Chi-Ho Lee, Incheon (KR); Hyung-Il Baek, Gyeonggi-do (KR); Beom-Jin Kim, Gyeonggi-do (KR); Jin-Won Noh, Gwangju (KR); Jong-Ho Park, Jeollabuk-do (KR)

(73) Assignee: AMOTECH CO., LTD., Incheon (KR)

( * ) Notice: Subject to any disclaimer, the term of this patent is extended or adjusted under 35 U.S.C. 154(b) by 94 days.

(21) Appl. No.: 14/891,201

(22) PCT Filed: May 13, 2014

(86) PCT No.: PCT/KR2014/004269
§ 371 (c)(1),
(2) Date: Jan. 29, 2016

(87) PCT Pub. No.: WO2014/185688
PCT Pub. Date: Nov. 20, 2014

(65) Prior Publication Data
US 2016/0197402 A1 Jul. 7, 2016

(30) Foreign Application Priority Data
May 13, 2013 (KR) .................. 10-2013-0053678

(51) Int. Cl.
*H01Q 7/06* (2006.01)
*H01Q 1/24* (2006.01)
*H04B 5/02* (2006.01)
*H04B 5/00* (2006.01)

(52) U.S. Cl.
CPC .............. *H01Q 7/06* (2013.01); *H01Q 1/243* (2013.01); *H04B 5/0081* (2013.01); *H04B 5/02* (2013.01)

(58) Field of Classification Search
CPC .................. H01Q 7/06; H01Q 1/243
USPC .......................................... 343/702
See application file for complete search history.

(56) References Cited

U.S. PATENT DOCUMENTS

2012/0326938 A1* 12/2012 Grossman .............. H01Q 19/26
343/833
2015/0171509 A1* 6/2015 Kato ........................ H01Q 1/38
343/702

FOREIGN PATENT DOCUMENTS

| JP | WO2010122888 | * 10/2010 | ............... H01Q 7/00 |
|----|---|---|---|
| KR | 10-0714542 B1 | 5/2007 | |
| KR | 10-2009-0126323 A | 12/2009 | |
| KR | 10-1098263 B1 | 12/2011 | |
| KR | 10-2012-0080929 A | 7/2012 | |
| KR | 10-2013-0030304 A | 3/2013 | |

(Continued)

*Primary Examiner* — Andrea Lindgren Baltzell
(74) *Attorney, Agent, or Firm* — Baker & Hostetler LLP (57) ABSTRACT

Disclosed are a NFC antenna module which maximizes antenna performance by mounting a radiation sheet in such a manner as to overlap a part of an antenna sheet and a portable terminal comprising the same. The disclosed NFC antenna module comprises: a first antenna sheet having a first radiation pattern formed along the outer periphery of a first central portion; a second antenna sheet having a second radiation pattern formed along the outer periphery of a second central portion in such a manner as to partially overlap with the first radiation pattern; and an electromagnetic wave shielding sheet laminated on the first antenna sheet and the second antenna sheet.

11 Claims, 8 Drawing Sheets

(56) References Cited

FOREIGN PATENT DOCUMENTS

WO 2010/122888 A1 10/2010
WO 2012/177437 A1 12/2012

\* cited by examiner

NFC ANTENNA MODULE AND PORTABLE TERMINAL COMPRISING SAME

This application is a National Stage of International patent application PCT/KR2014/004269, filed on May 13, 2014, which claims the benefit of Korean Patent Application No. 10-2013-0053678, filed May 13, 2013, which is hereby incorporated by reference in its entirety into this application.

TECHNICAL FIELD

The present invention generally relates to a Near-Field Communication (NFC) antenna module and, more particularly, to an NFC antenna module that is embedded in a portable terminal to communicate with NFC antenna modules embedded in other portable terminals, and to a portable terminal having the NFC antenna module.

BACKGROUND ART

With technological advances, portable terminals, such as a mobile phone, a Personal Digital Assistant (PDA), and a Portable Multimedia Player (PMP), a navigation system, and a laptop, are equipped to additionally provide short-range communication between devices, such as Digital Multimedia Broadcasting (DMB) and the wireless Internet, in addition to basic functions such as calling, playing video/music, and navigation. Accordingly, portable terminals are equipped with a plurality of antennas for wireless communication, such as wireless Internet and Bluetooth.

Further, recently, functions such as information exchange between terminals, payment, ticket booking, and searching using short-range communication (that is, NFC) have been applied to portable terminals. To this end, portable terminals are equipped with an antenna module (that is, an NFC antenna module) used for local communication. The NFC antenna module is a non-contact short-range wireless communication module, which uses Radio Frequency Identification (RFID) in a frequency band of about 13.56 Hz, and transmits data between terminals at short distances of about 10 cm. NFC is used in various areas such as the transmission of product information in supermarkets or stores, the transmission of travel information for visitors, traffic control, access control, and locking systems, in addition to payment.

Recently, markets for portable terminals such as tablet PCs and smart phones have rapidly extended. Portable terminals have a tendency to include functions, such as information exchange, payment, ticket booking, and searching, which use short-range communication (i.e. NFC). Accordingly, the demand for NFC antenna modules for use in short-range communication has increased.

In portable terminals, differential antenna type-NFC antenna modules are chiefly used. Such a differential antenna type-NFC antenna module receives signals from an external terminal through a radiator pattern and transfers signals only through a signal line connected to an end portion of the first side of the radiator pattern. Accordingly, since the strength of a signal received by a conventional NFC antenna module is weak, a problem arises in that reception performance in a reader mode is deteriorated and the recognition distance in the reader mode is shortened.

DISCLOSURE

Technical Problem

The present invention has been proposed to solve the above conventional problems, and an object of the present invention is to provide an NFC antenna module, in which radiation patterns formed on two antenna sheets are mounted to partially overlap each other, thus maximizing antenna performance, and to provide a portable terminal having the NFC antenna module.

Further, another object of the present invention is to provide an NFC antenna module, in which a radiation sheet is mounted to overlap part of antenna sheets, thus maximizing antenna performance, and to provide a portable terminal having the NFC antenna module.

Technical Solution

To accomplish the above objects, a Near-Field Communication (NFC) antenna module according to an embodiment of the present invention includes a first antenna sheet provided with a first radiation pattern formed along a peripheral surface of a first central part; a second antenna sheet provided with a second radiation pattern formed along a peripheral surface of a second central part, the second radiation pattern being formed to partially overlap the first radiation pattern; and an electromagnetic shielding sheet stacked on both the first antenna sheet and the second antenna sheet. Here, the second radiation pattern may include a lower pattern forming an area that overlaps a lower pattern of the first radiation pattern.

The NFC antenna module may further include a tuning element connected between both ends of the second radiation pattern.

The NFC antenna module may further include a radiation sheet stacked both on the first antenna sheet and on the second antenna sheet and provided with a portion that overlaps the first radiation pattern and the second radiation pattern. Here, the radiation sheet may form an area that overlaps a left pattern and a right pattern of the first radiation pattern, and form an area that overlaps a left pattern, a right pattern, and an upper pattern of the second radiation pattern.

The radiation sheet may include a first protrusion for forming an area that overlaps a left pattern of the first radiation pattern and a right pattern of the second radiation pattern; a second protrusion for forming an area that overlaps a right pattern of the first radiation pattern and a left pattern of the second radiation pattern; and a base element for forming an area that overlaps an upper pattern of the second radiation pattern. Here, the base element may be configured such that one or more slots, exposing part of the upper pattern of the second radiation pattern, are formed in the area that overlaps the upper pattern.

The radiation sheet may include a first radiation sheet including the first protrusion and part of the base element, first radiation sheet forming an area that overlaps the left pattern of the first radiation pattern and forming an area that overlaps the right pattern and the upper pattern of the second radiation pattern; and a second radiation sheet including the second protrusion and remaining part of the base element, the second radiation sheet forming an area that overlaps the right pattern of the first radiation pattern and forming an area that overlaps the left pattern and the upper pattern of the second radiation pattern. Here, the first radiation sheet and the second radiation sheet may be spaced apart from each other by a separation space in the area that overlaps the upper pattern of the second radiation pattern, and may be configured to expose the upper pattern of the second radiation pattern to outside through the separation space.

The electromagnetic shielding sheet may include a ferrite sheet.

Advantageous Effects

In accordance with the present invention, there is an advantage in that an NFC antenna module is configured such that radiation patterns formed on two antenna sheets are mounted to partially overlap each other, so that the radiation emitted from one radiation pattern is transferred to the other radiation pattern, thus extending a radiation area.

Further, the NFC antenna module is advantageous in that two antenna sheets are mounted to overlap each other, so that the radiation area is extended, thus maximizing antenna performance.

Furthermore, the NFC antenna module is advantageous in that radiation patterns formed on two antenna sheets and a radiation sheet made of a metal material are stacked to overlap each other, so that the radiation from the radiation patterns is also performed through the radiation sheet, thus maximizing antenna performance.

Furthermore, the NFC antenna module is advantageous in that slots are formed in part of the area of the radiation sheet that overlaps the radiation patterns, so that the area of the radiation sheet is reduced while antenna performance is maximized, thus reducing the unit cost.

BEST MODE

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 1:
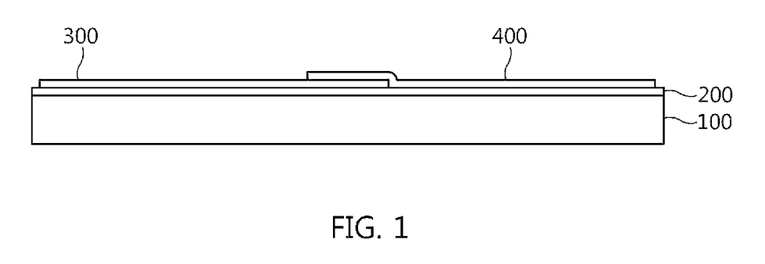
FIG. 1 is a diagram showing an NFC antenna module according to an embodiment of the present invention.
Figure 2:
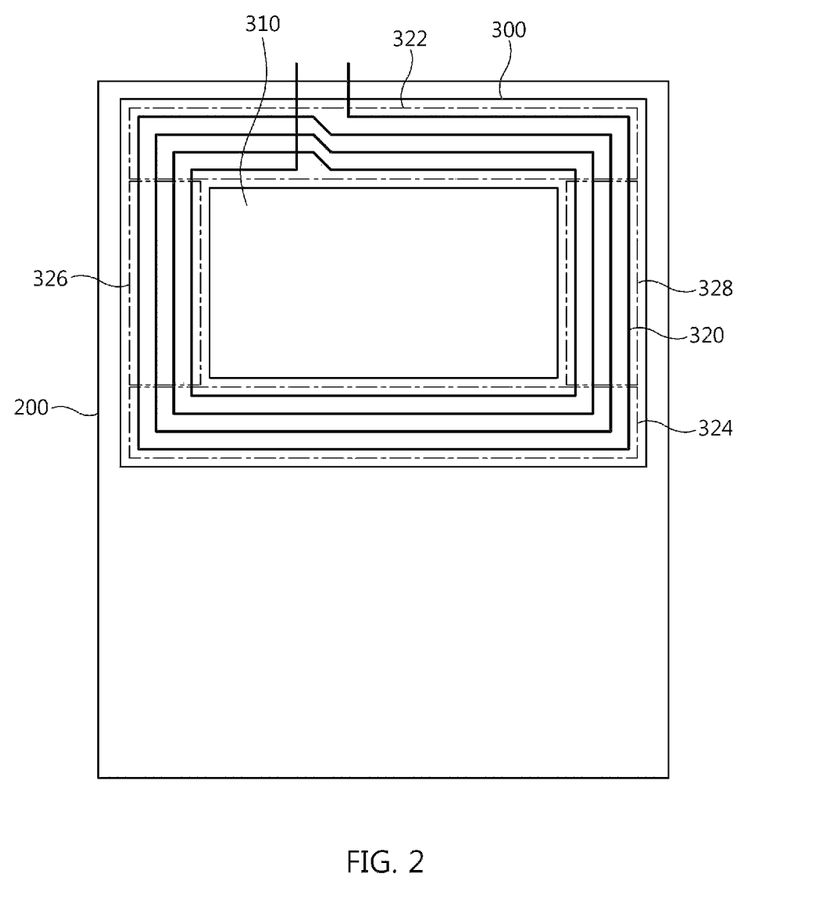
FIG. 2 is a diagram showing the first antenna sheet of FIG. 1.
Figure 3:
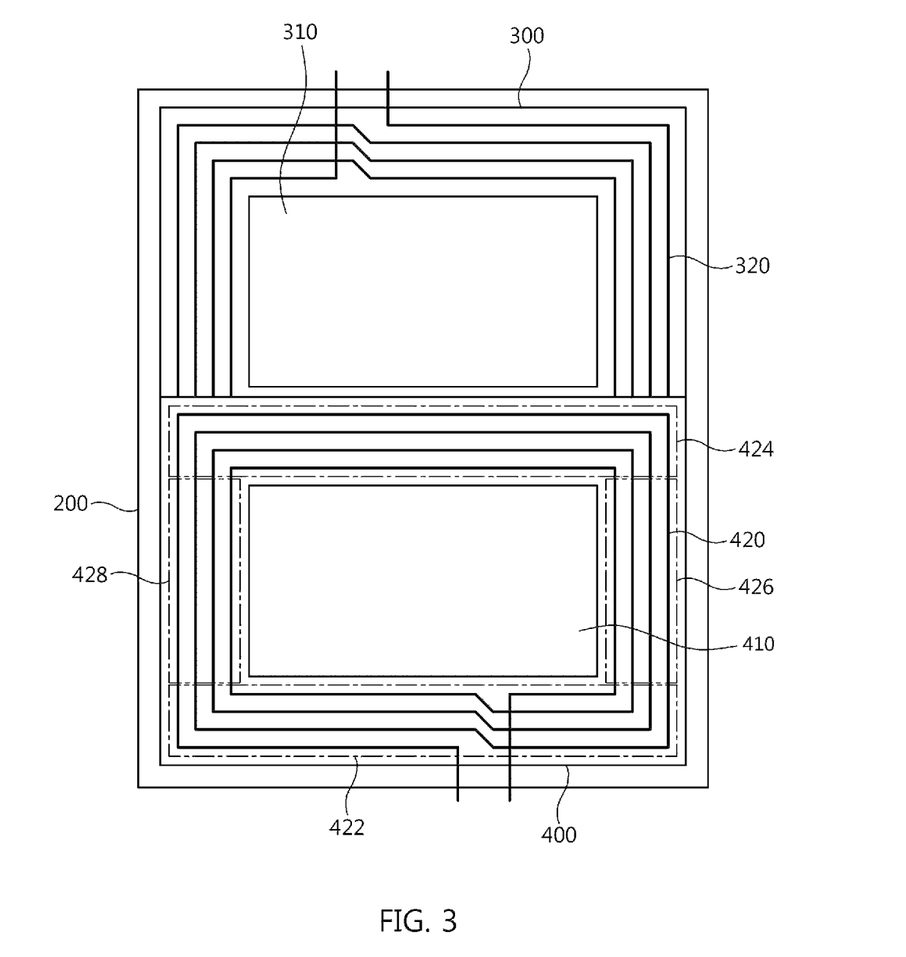
FIG. 3 is a diagram showing the second antenna sheet of FIG. 1.

FIG. 1 is a diagram showing an NFC antenna module according to an embodiment of the present invention, FIG. 2 is a diagram showing the first antenna sheet of FIG. 1, and FIG. 3 is a diagram showing the second antenna sheet of FIG. 1. As shown in FIG. 1, an NFC antenna module is configured to include an electromagnetic shielding sheet 200, a first antenna sheet 300, and a second antenna sheet 400. Here, in FIG. 1, the NFC antenna module is shown as being mounted on the battery pack 100 of a portable terminal, but may be mounted on the rear housing (not shown) of the portable terminal.

The electromagnetic shielding sheet 200 is implemented as a sheet made of an electromagnetic shielding material, such as a ferrite sheet. The electromagnetic shielding sheet 200 is mounted on the first surface of the battery pack 100 for supplying driving power to the portable terminal. Of course, the electromagnetic shielding sheet 200 may also be mounted on the rear housing (not shown) of the portable terminal.

The electromagnetic shielding sheet 200 is formed to cover all or part of the first surface of the battery pack 100. Accordingly, the electromagnetic shielding sheet 200 is formed to have an area that is less than or equal to that of the first surface of the battery pack 100.

The first antenna sheet 300 is stacked on one surface of the electromagnetic shielding sheet 200. That is, the antenna sheet is stacked on the second surface of the electromagnetic shielding sheet 200, which is opposite to the first surface of the electromagnetic shielding sheet 200 that is in contact with the battery pack 100. Here, as shown in FIG. 2, the antenna sheet is implemented as a Flexible Printed Circuit Board (FPCB), and a first radiation pattern 320, which resonates in an NFC frequency band, is formed on the first surface of the FPCB. Here, the first radiation pattern 320 is formed in the shape of a loop in which a wire is wound several times around a first central part 310 along the peripheral surface of the first central part 310. Both ends of the first radiation pattern 320 are connected to a feeder end (not shown) of the portable terminal through terminals (not shown) formed in the antenna sheet. Here, the portion in which both ends of the wire forming the first radiation pattern 320 are connected to the terminals is defined as a first upper pattern 322, and the portion opposite to the first upper pattern 322 is defined as a first lower pattern 324. The portion arranged on the left side of a straight line that connects the centers of the first upper pattern 322 and the first lower pattern 324 to each other is defined as a first left pattern 326, and the portion arranged on the right side of the straight line is defined as a first right pattern 328.

The first antenna sheet 300 is arranged on the first side of the first surface of the electromagnetic shielding sheet 200. That is, the antenna sheet is arranged to be biased on one of the upper side, the lower side, the left side, and the right side of the first surface of the electromagnetic shielding sheet 200. Here, the antenna sheet is formed to have an area less than or equal to the area of the electromagnetic shielding sheet 200.

The second antenna sheet 400 is stacked on one surface of the electromagnetic shielding sheet 200. That is, the second antenna sheet 400 is stacked on the second surface of the electromagnetic shielding sheet 200, which is opposite to the first surface of the electromagnetic shielding sheet 200 that is in contact with the battery pack 100. Here, as shown in FIG. 3, the second antenna sheet 400 is implemented as an FPCB, and a second radiation pattern 420, resonating in the NFC frequency band, is formed on the first surface of the FPCB. Here, the second radiation pattern 420 is formed in the shape of a loop in which a wire is wound several times around a second central part 410 along the peripheral surface of the second central part 410. Both ends of the second radiation pattern 420 are connected to a feeder end (not shown) of the portable terminal through terminals (not shown) formed in the second antenna sheet 400. Here, the portion in which both ends of the wire forming the second radiation pattern 420 are connected to the terminals is defined as a second upper pattern 422, and the portion opposite to the second upper pattern 422 is defined as a second lower pattern 424. The portion arranged on the left side of a straight line that connects the centers of the second upper pattern 422 and the second lower pattern 424 to each other is defined as a second left pattern 426, and the portion arranged on the right side of the straight line is defined as a second right pattern 428.

The second antenna sheet 400 is arranged on the second side of the first surface of the electromagnetic shielding sheet 200. That is, the second antenna sheet 400 is arranged on the first surface, which is the same surface on which the first antenna sheet 300 is arranged, and is arranged to be biased on the second side, opposite to the first side, on which the first antenna sheet 300 is arranged. Accordingly, part of the second radiation pattern 420 of the second antenna sheet 400 forms an area that overlaps part of the first radiation pattern 320 of the first antenna sheet 300. At this time, the second lower pattern 424 of the second radiation pattern 420 is stacked on the top of the first lower pattern 324 of the first radiation pattern 320 to form the overlapping area. The first radiation pattern 320 and the second radiation pattern 420 are spaced apart from each other by a predetermined distance through a base plate of the FPCB, which forms the second antenna sheet 400, or a separate resin layer.

Accordingly, when radiation occurs on the first radiation pattern 320, the radiation is transferred to the second radiation pattern 420 due to a coupling effect, so that the radiation simultaneously occurs both on the first radiation pattern 320 and on the second radiation pattern 420, thus maximizing antenna performance.

Figure 4:
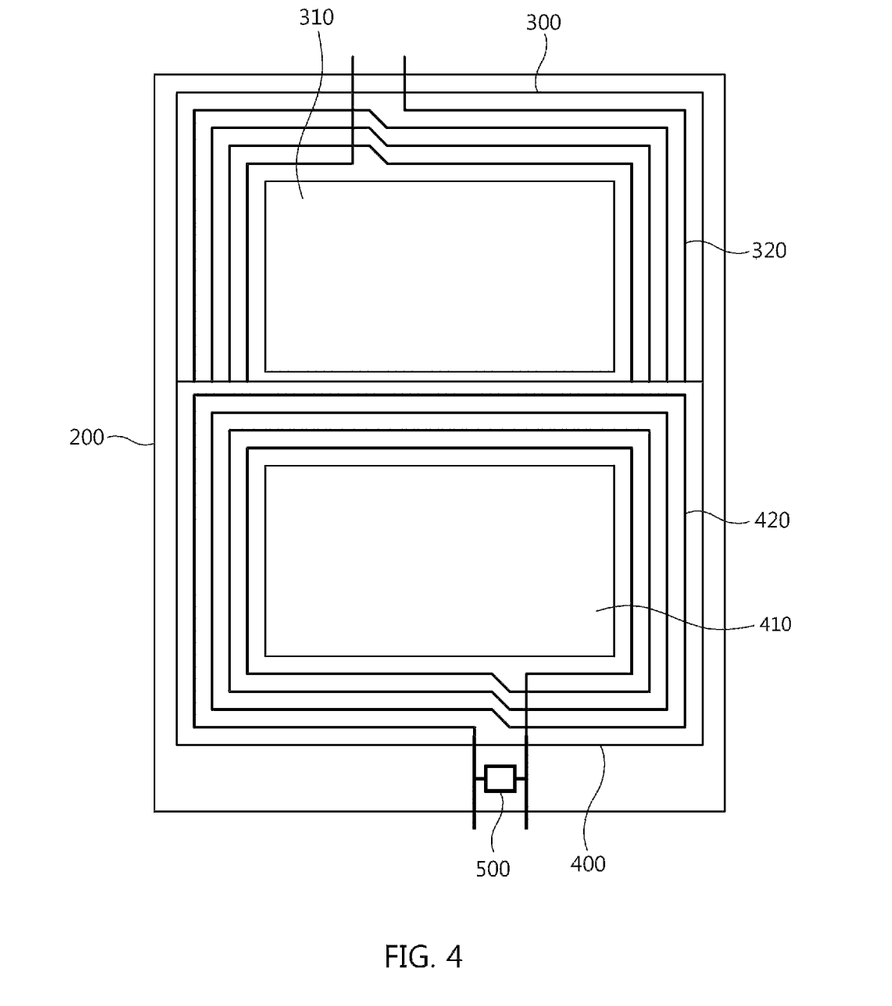
FIG. 4 is a diagram showing a modification of the NFC antenna module according to the embodiment of the present invention.

FIG. 4 is a diagram showing a modification of the NFC antenna module according to the embodiment of the present invention. As shown in FIG. 4, the NFC antenna module may further include a tuning element 500 for tuning the antenna characteristics. The tuning element 500 is implemented as a capacitor. The tuning element 500 may be connected in parallel between both ends of the second radiation pattern 420 formed in the second antenna sheet 400, or between both ends of the first radiation pattern 320 formed in the first antenna sheet 300. Of course, the tuning element 500 may be composed of multiple capacitors, which may be respectively connected in parallel between both ends of the second radiation pattern 420 and between both ends of the first radiation pattern 320. Here, the tuning element 500 is advantageous in that the antenna characteristics may be finely tuned by changing the capacitance of the capacitor.

Figure 5:
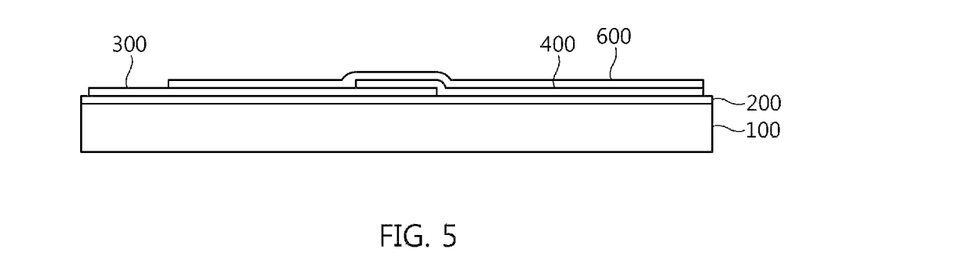
FIG. 5 is a diagram showing another modification of the NFC antenna module according to the embodiment of the present invention.
Figure 6:
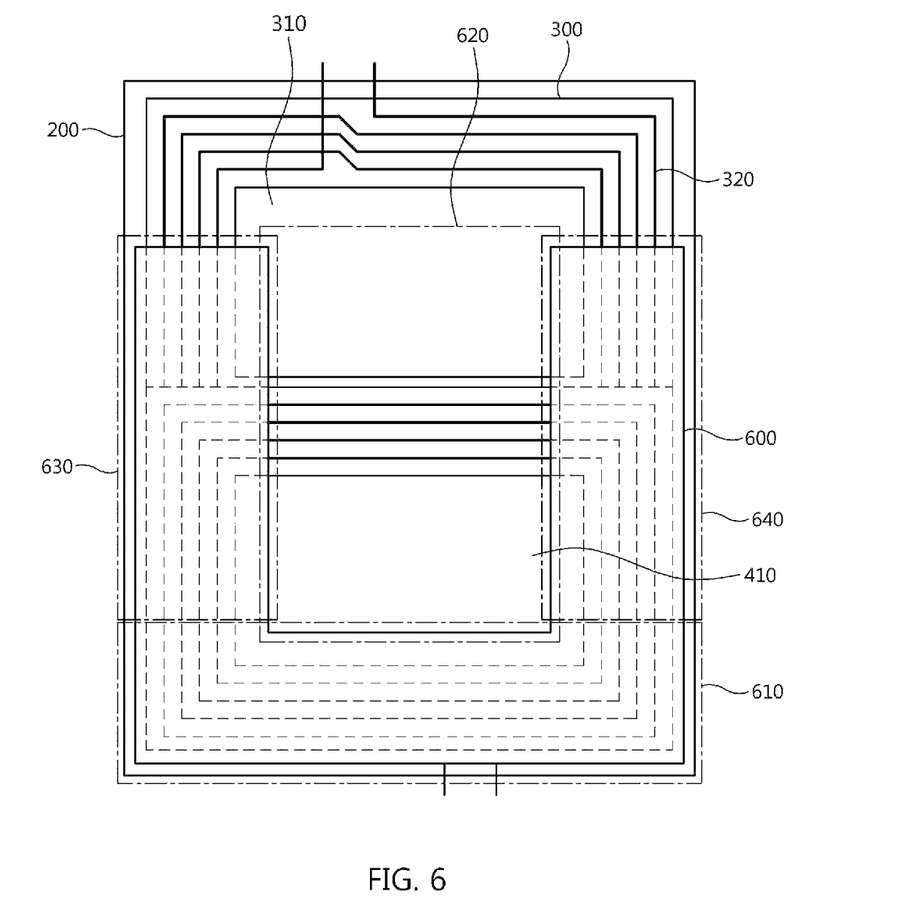
FIGS. 6 to 8 are diagrams showing the radiation sheet of FIG. 5.
Figure 7:
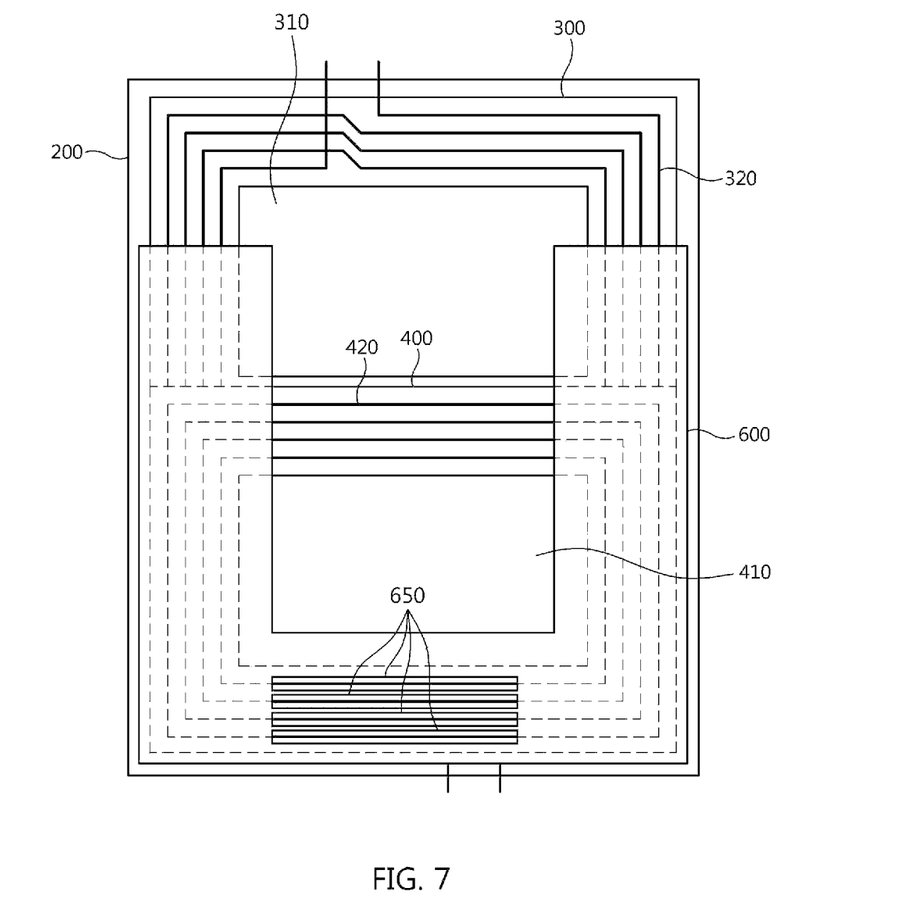
Figure 8:
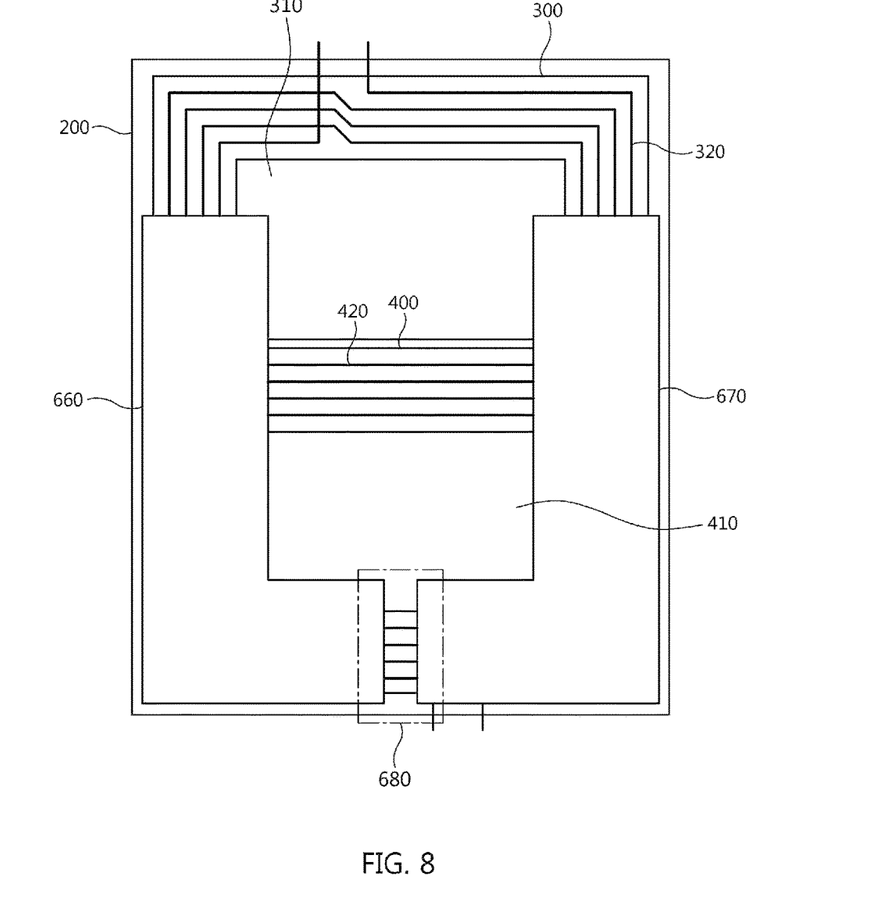

FIG. 5 is a diagram showing another modification of the NFC antenna module according to the embodiment of the present invention. FIGS. 6 to 8 are diagrams showing the radiation sheet of FIG. 5.

As shown in FIG. 5, the NFC antenna module may further include a radiation sheet 600. The radiation sheet 600 is made of a metal material and is stacked on the first surfaces of the first antenna sheet 300 and the second antenna sheet 400. The radiation sheet 600 is stacked on the first antenna sheet 300 and the second antenna sheet 400 to form an overlapping area, and acts as an auxiliary radiator for the first radiation pattern 320 and the second radiation pattern 420. In this regard, the radiation sheet 600 may act as an auxiliary radiator while being in contact with the first radiation pattern 320 and the second radiation pattern 420 in the overlapping area, or may act as an auxiliary radiator due to a coupling effect while being spaced apart from both the first radiation pattern 320 and the second radiation pattern 420 by a predetermined distance. By means of this, the radiation on the first radiation pattern 320 and the second radiation pattern 420 is also performed through the radiation sheet 600, and thus antenna performance may be maximized.

In this case, as shown in FIG. 6, a rectangular depression 620 is formed in a portion of the radiation sheet 600 to expose the first central part 310 of the first antenna sheet 300 and the second central part 410 of the second antenna sheet 400. In the radiation sheet 600, a base element 610 is formed under the depression 620, a second protrusion 640 is formed on the right side of the depression 620, and a first protrusion 630 is formed on the left side of the depression 620. Here, the radiation sheet 600 is formed in a U-shape, and the base element 610 forms an area that overlaps the upper pattern of the second radiation pattern 420, a first protrusion 630 forms an area that overlaps both part of the first left pattern 326 and all of the second right pattern 428, and the second protrusion 640 forms an area that overlaps both part of the first right pattern 328 and all of the second left pattern 426. Accordingly, the radiation sheet 600 acts as an auxiliary radiator for the radiation patterns, so that the area of radiation increases, and antenna performance may be maximized thanks to the increase in the radiation area.

Meanwhile, as shown in FIG. 7, in the radiation sheet 600, one or more slots 650 may be formed in the base element 610. That is, in the area of the base element 610 that overlaps the second upper pattern 422, multiple slots 650 are formed. Here, the multiple slots 650 are formed to be spaced apart from each other by a predetermined interval, and part of the second upper pattern 422 is exposed through the multiple slots 650. By means of this structure, the area of the radiation sheet 600 may be reduced while antenna characteristics identical to those of the NFC antenna module, to which the radiation sheet 600 shown in FIG. 6 is applied, may be maintained, thus reducing the unit cost.

Meanwhile, as shown in FIG. 8, the radiation sheet 600 may also include a first radiation sheet 660 and a second radiation sheet 670.

The first radiation sheet 660 is formed in an L-shape while including the first protrusion 630 and part of the base element 610. The first radiation sheet 660 forms an area that overlaps part of the first left pattern 326 of the first radiation pattern 320 and the second right pattern 428 and the second upper pattern 422 of the second radiation pattern 420.

The second radiation sheet 670 is formed in an inverted L-shape while including the second protrusion 640 and the remaining part of the base element 610. The second radiation sheet 670 forms an area that overlaps part of the first right pattern 328 of the first radiation pattern 320 and the second left pattern 426 and the second upper pattern 422 of the second radiation pattern 420.

Here, the first radiation sheet 660 and the second radiation sheet 670 form a separation space 680 while being spaced apart from each other by a predetermined distance in the area that overlaps the second upper pattern 422. Part of the second upper pattern 422 of the second radiation pattern 420 is exposed through the separation space 680.

By means of this structure, the radiation sheet 600 acts as an auxiliary radiator for the first radiation pattern 320 and the second radiation pattern 420, whereby the radiation area is increased, and antenna performance may be maximized thanks to the increase in the radiation area.

As described above, the NFC antenna module is advantageous in that radiation patterns formed on two antenna sheets are mounted to partially overlap each other, so that the radiation emitted from one radiation pattern is transferred to the other radiation pattern, thus extending a radiation area.

Further, the NFC antenna module is advantageous in that two antenna sheets are mounted to overlap each other, so that the radiation area is extended, thus maximizing antenna performance.

Furthermore, the NFC antenna module is advantageous in that radiation patterns formed on two antenna sheets and a radiation sheet made of a metal material are stacked to overlap each other, so that the radiation from the radiation patterns is also performed through the radiation sheet, thus maximizing antenna performance.

Furthermore, the NFC antenna module is advantageous in that slots are formed in part of the area of the radiation sheet that overlaps the radiation patterns, so that the area of the radiation sheet is reduced while the antenna performance is maximized, thus reducing the unit cost.

Although the preferred embodiments of the present invention have been disclosed for illustrative purposes, those skilled in the art will appreciate that various modifications and changes are possible, without departing from the scope and spirit of the invention as disclosed in the accompanying claims.

What is claimed is:

1. A Near-Field Communication (NFC) antenna module, comprising:
    a first antenna sheet provided with a first radiation pattern formed along a peripheral surface of a first central part;
    a second antenna sheet provided with a second radiation pattern formed along a peripheral surface of a second central part, the second radiation pattern being formed to partially overlap the first radiation pattern;
    an electromagnetic shielding sheet stacked on both the first antenna sheet and the second antenna sheet; and
    a radiation sheet stacked both on the first antenna sheet and on the second antenna sheet and provided with a portion that overlaps the first radiation pattern and the second radiation pattern.

2. The NFC antenna module of claim 1, wherein the second radiation pattern comprises a lower pattern forming an area that overlaps a lower pattern of the first radiation pattern.

3. The NFC antenna module of claim 1, further comprising a tuning element connected between both ends of the second radiation pattern.

4. The NFC antenna module of claim 1, wherein the radiation sheet forms an area that overlaps a left pattern and a right pattern of the first radiation pattern, and forms an area that overlaps a left pattern, a right pattern, and an upper pattern of the second radiation pattern.

5. The NFC antenna module of claim 1, wherein the radiation sheet comprises:
    a first protrusion for forming an area that overlaps a left pattern of the first radiation pattern and a right pa of the second radiation pattern;
    a second protrusion for forming an area that overlaps a right pattern of the first radiation pattern and a left pattern of the second radiation pattern; and
    a base element for forming an area that overlaps an upper pattern of the second radiation pattern.

6. The NFC antenna module of claim 5, wherein the base element is configured such that one or more slots, exposing part of the upper pattern of the second radiation pattern,are formed in the area that overlaps the upper pattern.

7. The NFC antenna module of claim 5, wherein the radiation sheet comprises:
    a first radiation sheet comprising the first protrusion and part of the base element, first radiation sheet forming an area that overlaps the left pattern of the first radiation pattern and forming an area that overlaps the right pattern and the upper pattern of the second radiation pattern; and
    a second radiation sheet comprising the second protrusion and remaining part of the base element, the second radiation sheet forming an area that overlaps the right pattern of the first radiation pattern and forming an area that overlaps the left pattern and the upper pattern of the second radiation pattern.

8. The NFC antenna module of claim 7, wherein the first radiation sheet and the second radiation sheet are spaced apart from each other by a separation space in the area that overlaps the upper pattern of the second radiation pattern, and are configured to expose the upper pattern of the second radiation pattern to outside through the separation space.

9. The NFC antenna module of claim 1, wherein the electromagnetic shielding sheet comprises a ferrite sheet.

10. A portable terminal comprising the NFC antenna module of claim 1.

11. The portable terminal of claim 10, wherein the NFC antenna module is mounted on a battery pack or a rear housing of the portable terminal.

* * * * *